United States Patent [19]

Okada et al.

[11] Patent Number: 4,646,293

[45] Date of Patent: Feb. 24, 1987

[54] MULTIACCESS COMMUNICATIONS SYSTEM

[75] Inventors: Hiromi Okada, Nishinomiya; Yoshiro Nakanishi, Osaka; Yoshifumi Nomura, Kobe, all of Japan

[73] Assignee: Ricoh Company, Ltd., Tokyo, Japan

[21] Appl. No.: 672,484

[22] Filed: Nov. 19, 1984

[30] Foreign Application Priority Data

Nov. 19, 1983 [JP] Japan ................................ 58-217083

[51] Int. Cl.$^4$ .............................................. H04J 1/10
[52] U.S. Cl. ...................................... 370/85; 370/124; 370/94
[58] Field of Search .................. 370/30, 69.1, 124, 85, 370/60, 94; 340/825.5

[56] References Cited

U.S. PATENT DOCUMENTS 4,365,331 12/1982 Biba et al. ............................ 370/124

OTHER PUBLICATIONS

IBM Tech. Disclosure Bulletin, vol. 21, No. 10, Mar. 1979, "Frequency Allocation for F.D.M. Communication", by H. R. Foglia et al.

Primary Examiner—Douglas W. Olms
Assistant Examiner—Kenneth I. Rokoff
Attorney, Agent, or Firm—Cooper, Dunham, Griffin & Moran

[57] ABSTRACT

A multiaccess communications system for a communications network in which a plurality of nodes are connected to a head end by a common transmission path to perform wideband transmission of packets between the nodes, particularly a multiaccess communications system such as a carrier sensing multiaccess (CSMA) system or a collision sensing CSMA (CSMA/CD) system. A single transmission cable or a pair of transmission cables are efficiently shared by various channels. Each of the nodes is provided with a transceiver in association with the cable or the cables. All the channels are effectively utilized by means of a relatively simple system construction.

20 Claims, 6 Drawing Figures

MULTIACCESS COMMUNICATIONS SYSTEM

BACKGROUND OF THE INVENTION

The present invention relates to a multiaccess communications system and, more particularly, to such a multiaccess communication system as a carrier sensing multiaccess (CSMA) system or a collision detecting CSMA (CSMA/CD) system in a local communications network (LAN).

Local communications networks installed in private facilities, for example, include a so-called CSMA/CD system in which communications terminals are commonly connected to intermediate taps of a coaxial cable via individual transceivers. Each of the terminals is capable of transmitting an information signal to another terminal independently of the others. Upon collision of transmission between the terminals, the transmission is interrupted at each terminal to repeat it after a random waiting time. The coaxial cable may, for example, be 500 meters to 2 killometers long and provided with a transmission band of about 20 MHz so as to transmit base band pulse signals. Information which such a system may transmit includes picture, speech and data and is assembled in a packet or like message block. A destination address and such control codes as a check code are added to the message block.

The CSMA/CD system is used with ETHERNET or the like as a major communications system of a bus type local computer network (LCN). While the system exhibits relatively good performance under a simple control, the problem is that under a heavy load it encounters an increase in delay which eventually would lead to deterioration of the performance. Another problem is that considering the actual packet length $L_p$ the maximum allowable distance D between remotest stations is not more than about 2.5 killometers when the line speed C is 10 Mbps (megabits per second).

In light of the above, there has been proposed a channel division type CSMA/CD system which divides a channel capacity to provide a plurality of channels and effects random access channel by channel (presented by Yoshifumi Nomura in a paper entitled "Channel Division Type CSMA-CD System", Preparatory Manuscripts, Showa 58 (1983) National Conference of The Institute of Electronics And Communication Engineers of Japan. In accordance with the proposed system, the channel capacity is divided to set up a plurality of channels and, by allocating packet holding stations to the respective channels, access is made with the CSMA/CD approach. The proposed system, therefore, may offer a remarkable improvement in throughput-delay performance under a heavy load condition, compared to the prior art system which relies on a single large capacity channel.

Intuitively, division of a channel to n subchannels may be implemented in the base band by use of n cables. However, the increase in the number of cables by n times would render the construction intricate. The intricacy of construction would further be enhanced by the need for n transceivers which are to be connected to the n cables. In a wide band, while a single cable suffices if the frequency is divided into n frequencies, the intuitive technique employing the same principle as in the base band would require n transceivers for each of the taps. Should the number n be large, difficulty would be experienced in practicing the method for economic reasons.

SUMMARY OF THE INVENTION

It is therefore an object of the present invention to provide a multiaccess communication system which promotes effective use of all the channels by means of a simple system construction.

It is another object of the present invention to provide a generally improved multiaccess communications system.

In a mutiaccess communications system for a communications network in which a plurality of nodes are connected to a head end by a common transmission path to perform wideband transmission of packets between the nodes of the present invention, each of the plurality of nodes selects unoccupied one of a plurality of first channels to send a packet toward the head end over the selected unoccupied channel. The head end temporarity stores the packets received over the first channels, and sequentially transmits the packets in the order of completion of the storage toward the plurality of nodes over a second channel. The second channel has a line speed which is substantially equal to a product of a line speed of the first channels and a number of the first channels. Each of the plurality of nodes receives the second channel to fetch a packet which is meant therefor.

In accordance with the present invention, a multiaccess communications system for a communications network in which a plurality of nodes are connected to a head end by a common transmission path to perform wideband transmission of packets between the nodes, particularly a multiaccess communications system such as a carrier sensing multiaccess (CSMA) system or a collision sensing CSMA (CSMA/CD) system. A single transmission cable or a pair of transmission cables are efficiently shared by various channels. Each of the nodes is provided with a transceiver in association with the cable or the cables. All the channels are effectively utilized by means of a relatively simple system construction.

The above and other objects, features and advantages of the present invention will become more apparent from the following detailed description taken with the accompanying drawings.

DESCRIPTION OF THE PREFERRED EMBODIMENTS

While the multiaccess communications system of the present invention is susceptible of numerous physical embodiments, depending upon the environment and requirements of use, substantial numbers of the herein shown and described embodiments have been made, tested and used, and all have performed in an eminently satisfactory manner.

Figure 1:
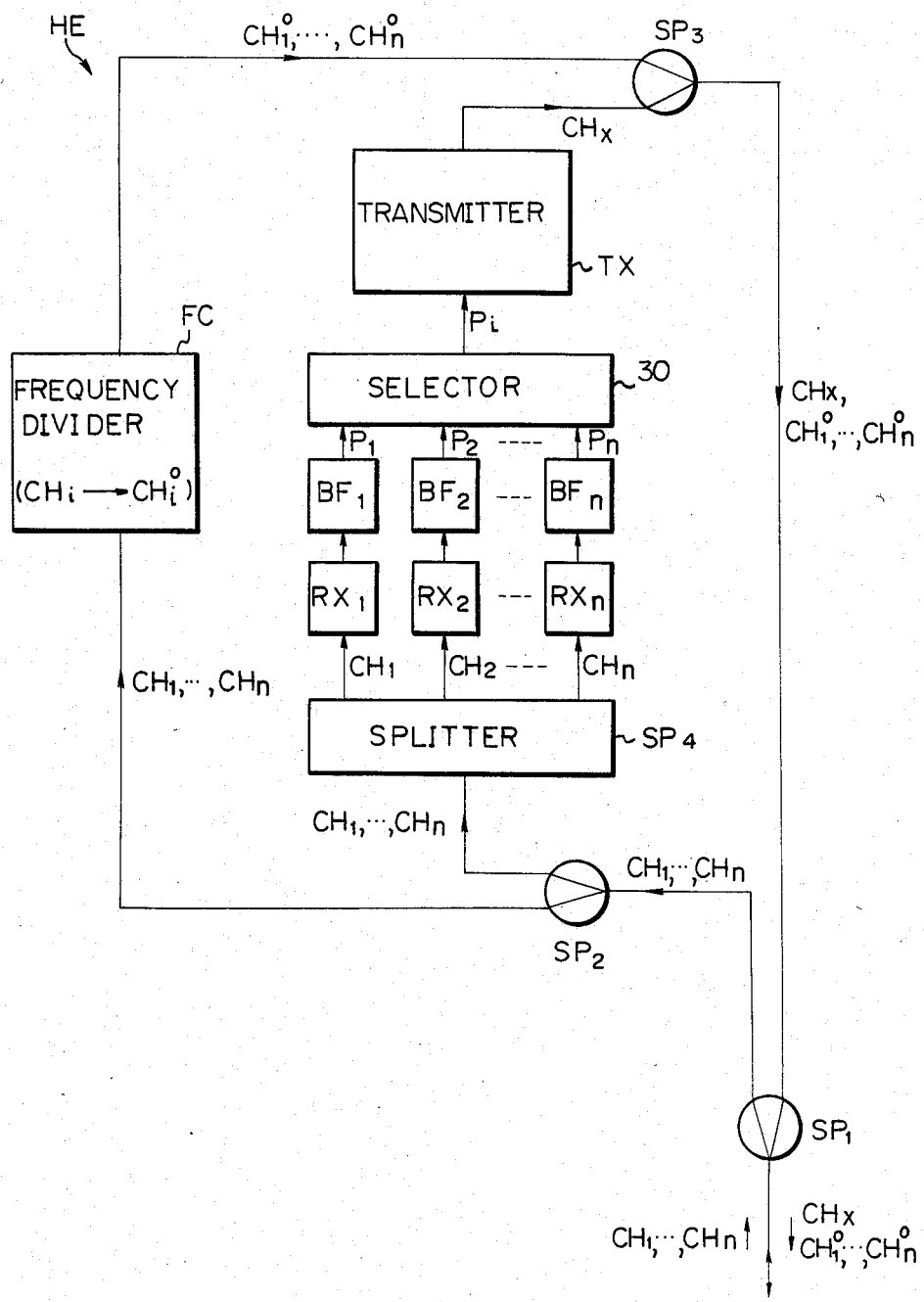
FIG. 1 is a block diagram of a head end which is included in a multiaccess communications system embodying the present invention.
Figure 2:
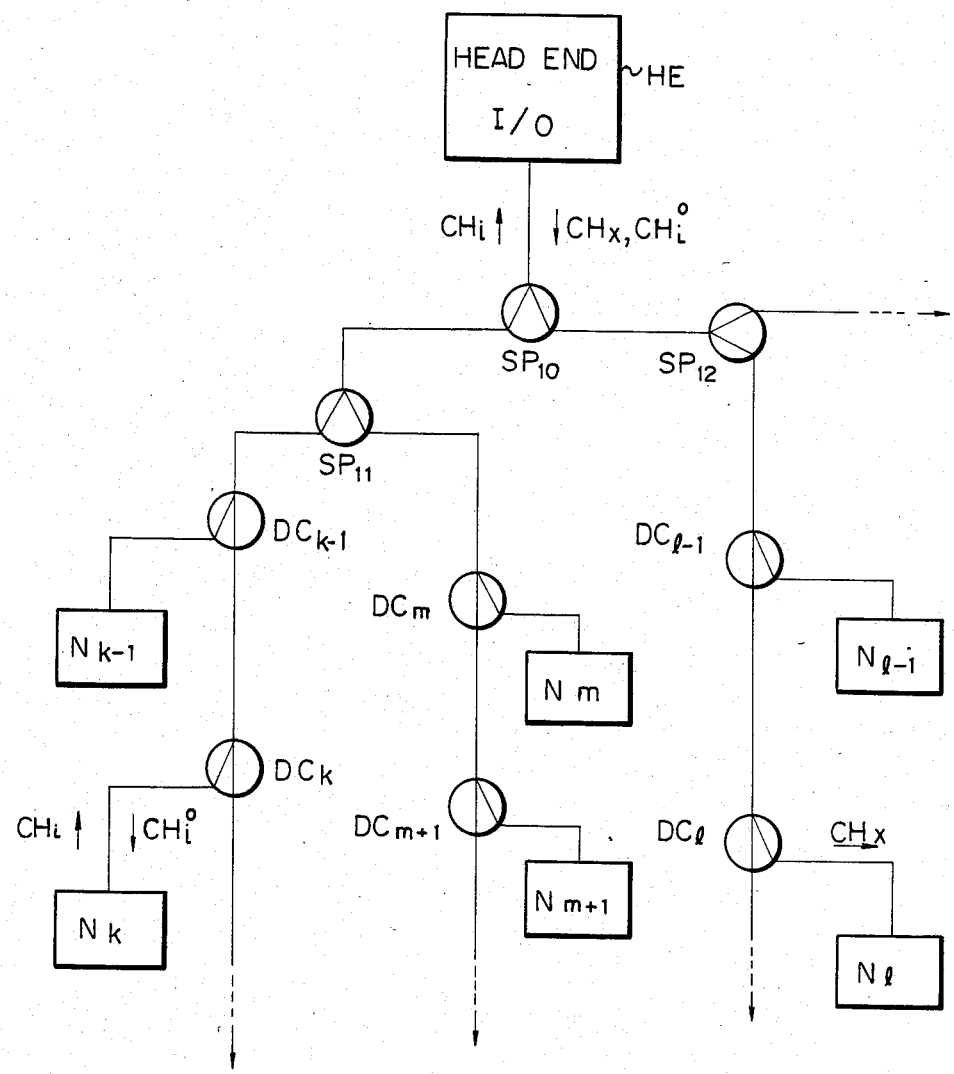
FIG. 2 is a block diagram of the overall system construction of the embodiment shown in FIG. 1.
Figure 3:
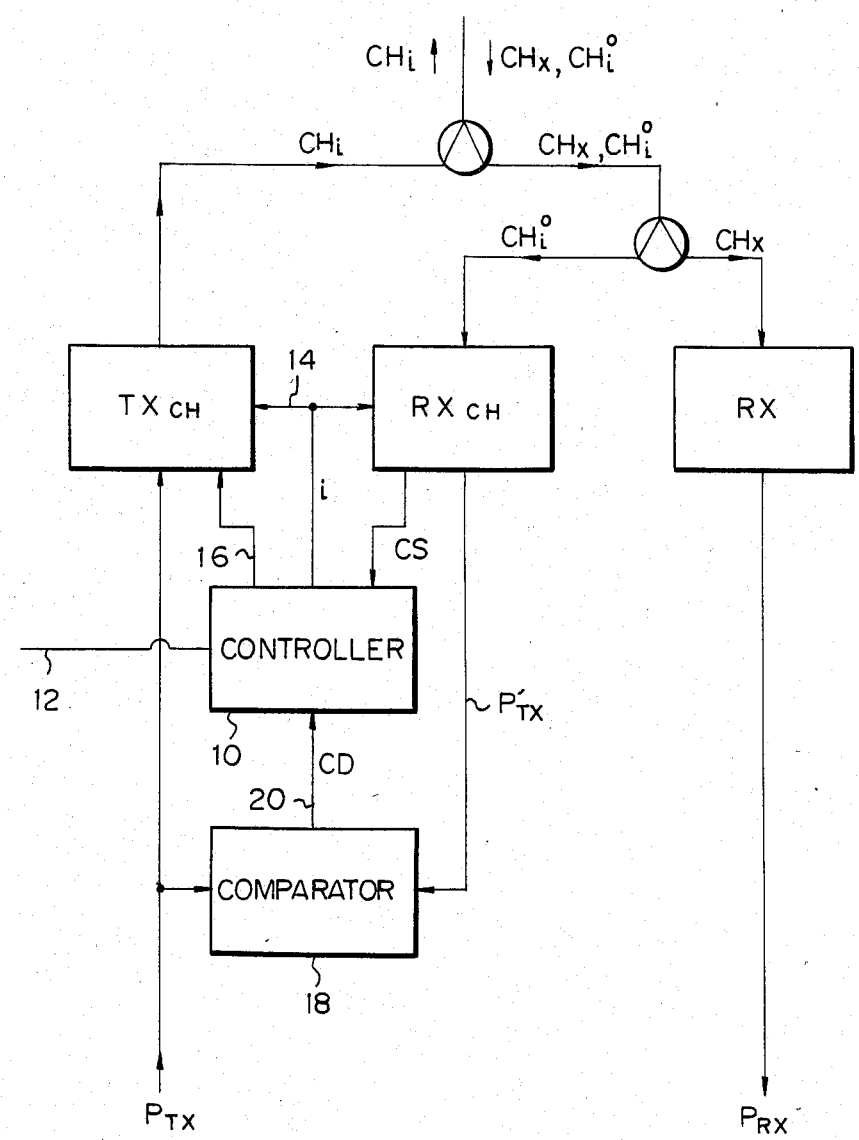
FIG. 3 is a block diagram of representative one of various knodes.

Referring to FIGS. 1-3, a multiaccess communications system embodying the present invention is shown. Specifically, FIG. 1 shows a construction of a head end HE, FIG. 2 a procedure for a packet to be transmitted from a node $N_k$ to a node $N_l$, and FIG. 3 a construction of any one of the nodes. The illustrated system represents a single cable type system in which up-going channels $CH_1, \ldots, CH_n$ occupy a low frequency band and down-going channels $CH_x$ and $CH_1°, \ldots, CH_n°$ a high frequency band, by way of example. Let it be understood that the "up-going" channels extend from the nodes to the head end and the "down-going" channels from the head end to the nodes.

In FIG. 3, a certain node $N_k$ intending to send a packet starts an operation with delivering a transmission command 12 to a controller 10. The controller 10 then selects one of n channels, i.e. i-th channel, and conditions a transmitter $TX_{CH}$ and a receiver $RX_{CH}$ for the channel i, as represented by a control line 14. The receiver $RX_{CH}$ receives a channel $CH_i°$ and performs carrier sensing (CS). If any carrier is sensed, meaning that the selected channel has been occupied, the controller 10 selects another channel and repeats the same procedure.

If no carrier is sensed, that is, if the selected channel is unoccupied or empty, the controller 10 applies a carrier transmission command to the transmitter $TX_{CH}$ (signal line 16) so as to start transmission of a desired packet $P_{TX}$ using the channel $CH_i$. The signal on the channel $CH_i$, as shown in FIG. 2, propagates through a directional coupler $DC_k$ and $DC_{k-1}$ and splitters $SP_{11}$ and $SP_{10}$ to an input/output (I/O) section of the head end HE. From the I/O section, the signal advances to a splitter $SP_1$ and, then, to a splitter $SP_2$ from which two different paths diverge. That is, the signal output from the splitter $SP_2$ is passed on one hand to a frequency converter FC and on the other hand to a receiver $PX_i$ via a splitter $SP_4$.

The frequency conveter FC converts the frequency of the input signal $CH_i$ (hereinafter referred to simply as $CH_i$ insofar as the signal on the channel $CH_i$ and the channel $CH_i$ have no chance to be confused) to produce a signal $CH_i°$. The signal $CH_i°$ propagates through a splitter $SP_3$ and the splitter $SP_1$ to be sent out from the head end HE in the down-going direction and returns to the node $N_k$ by way of the splitters $SP_{10}$ and $SP_{11}$ and directional couplers $DC_{k-1}$ and $DC_k$ (FIG. 2). The signal $CH_i°$ arrived at the node $N_k$ is received by the receiver $RX_{CH}$ (FIG. 3).

A packet $P'_{TX}$ received by the receiver $RX_{CH}$ should be identical with the transmitted packet $P_{TX}$ if transmission from another node has not occurred in the same channel $CH_i$ substantially at the same time as the packet $P_{TX}$, that is, if a collision has not occurred. A comparator 18 (FIG. 3) compares the packets $P_{TX}$ and $P'_{TX}$ to perform collision detection (CD). The result of the comparison is applied to the controller 10 as represented by a control line 20. A collision is represented by the fact that the $P_{TX}$ and $P'_{TX}$ compare unequal at the comparator 18. Such a CD operaion is commonly employd in a general CSMA/CD system and, therefore, any further description thereof will be omitted for simplicity.

Upon detection of a collision, the controller 10 interrupts the carrier transmission command to thereby suspend the transmission of the packet from the transmitter $TX_{CH}$. Thereafter, the controller 10 tries packet transmission again upon the lapse of a suitable period of time by a technique which is generally known as backoff algorithm. Here, in accordance with the present invention, the system is provided with a plurality of channels to allow another unoccupied channel to be used for the second transmission and, hence, the backoff time before the second transmission is far shorter than one necessary for the generally used single channel CSMA/CD system. The operation of the transmitting node is the same as in the prior art CSMA/CD system except for the provision of a plurality of channels.

Meanwhile, the signal $CH_i$ applied to the receiver $RX_i$ of the head end HE is delivered to a buffer $BF_i$. After one packet $P_i$ has been received, that is, after the complete packet $P_i$ has been stored in the buffer $BF_i$, it is transferred by a selector 30 to a transmitter TX (FIG. 1). The selector 30 sequentially selects those of n buffers $BF_1$-$BF_n$ which have stored individual complete packets.

In the illustrative embodiment, the line speed $C_X$ of the transmitter TX may be about n times the line speed $C^I$ of the receiver $RX_i$ (or $TX_{CH}$ or $RX_{CH}$). For the simplicity of description, asscume $$C_X = n \cdot C^I$$

It follows that even if all the receivers $RX_1$-$RX_n$ have consecutively received packets, the transmitter TX is capable of sequentially retransmitting all the packets sequentially.

In detail, let $T_P$ (bits) be the average packet length. Then, an average transmission time $\overline{T_{PCH}}$ of one packet in each of the up-going channels ($CH_1, \ldots, CH_n$ and that $\overline{T_{PX}}$ in the down-going channel $CH_X$ are expressed as:

$$\overline{T_{PCH}} = \frac{\overline{L_p}}{C^I}$$

$$\overline{T_{PX}} = \frac{\overline{L_p}}{C_X} = \frac{\overline{L_p}}{n \cdot C^I} = \frac{1}{n} \cdot \overline{T_{CH}}$$

It will be seen from the above equations that the packet transmission time in the channel $CH_X$ is 1/n the packet transmission time in the channel $CH_i$ and, therefore, the single channel $CH_X$ suffices the retransmission of the packet Pi associated with the up-going channel $CH_i$.

The packet $P_i$ retransmitted from the transmitter TX is passed through the splitters $SP_3$ and $SP_1$ to be sent out from the head end HE as a signal $CH_X$. The signal $CH_X$ is then routed through the splitter $SP_{10}$, a splitter $SP_{12}$ and directional couplers $DC_{l-1}$ and $DC_l$ to a certain node for which the packet is meant, e.g. node $N_l$ (FIG. 2). In detail, the signal $CH_X$ is sent to all the nodes in the network and all the nodes receive the signal $CH_X$; each node fetches only a packet which includes an address coinciding with the own node's address. In this example, it is the node $N_l$ that fetches the signal $CH_X$. In the manner described, a packet is sent from the node $N_k$ to the node $N_l$.

A characteristic feature and the present invention is that it realizes a multi-channel system while preserving the simplicity particular to the competitive protocol attainable with the CSMA/CD system. That is, the present invention eliminates the need for preparatory transactions between transmitting and receiving sides.

Generally, a multi-channel arrangement at a transmitting side has to be accompanied by a multi-channel arrangement at a receiving side. If the receiving side is not informed of a specific channel over which a desired packet will arrive, it has to receive all the channels at the same time and, hence, requires as many as n receivers. The illustrative embodiment settles such a problematic situation using, for the down-going direction, channels with a line speed which is about n times that of the up-going channels. That is, each node can receive packets sent out to all the up-going channels merely by receiving the high-speed (line speed of $n \cdot C^I$) channel $CH_X$.

Another characteristic feature of the present invention is that a protocol substantially common to that of the conventional CSMA/CD system is usable. What is especially noteworthy in this connection is the enhanced freedom of transmission (up-going direction) channel selection.

The description made so far has concentrated to a line speed $C_X$ in the down-going channel $CH_X$ which is n times the line speed $C^I$ in the up-going channels $CH_i$. In practice, however, the line speed $C_X$ does not have to be exactly n times the line speed $C^I$. It will be apparent that a line speed $C_X$ more than n times the line speed $C^I$, $C_X > n \cdot C^I$, is no problem. Conversely, even if the line speed $C_X$ is somewhat less than n times the line speed $C^I$, $C_X < n \cdot C^I$ or $C_X \approx n \cdot C^I$, the system will normally operate.

Concerning the CSMA/CD system or the CSMA system, the system throughput is less than 100% and cannot be increased to 100%. Where the total transmission capacity is increased by a multi-channel construction as in the present invention, it can be designed far larger than one which would be required during peak traffic periods. Such allows the system to be so conditioned as to cause a minimum of collisions. Further, since the channel $CH_X$ has no chance of collision, it needs only to be matched to the peak of the required transmission capacity.

It will be needless to mention that the present invention also features some generally observed advantages of the multiplex channel type, or divided channel type, CSMA/CD system. For example, extra channels can be installed without any substantial modification in system construction by increasing the frequency bands within a certain range. In addition, it is needless to assign a substantial capacity to each channel. Therefore, an improvement in characteristic due to the CSMA effect is achievable.

Furthermore, as previously described, the freedom of channel selection in the event of competitive control is significant, offering stable characteristics. By virtue of the insignificant possibility of collision, the probability of waiting and the waiting time are reduced which may be encountered in the event of using another node in the transmission path.

The channels may alternatively be assigned to different kinds traffics such as data, pictures and speech, and different characteristics such as packet length and packet generation pattern, and even different kinds of services. In addition, priority among the nodes which matches with a particular channel selection principle may be introduced into the system.

The system of the present invention may be implemented by a dual cable system as well as by the single cable system described above. In the case of the dual cable system, independent cables will be used for the up- and down-going paths. In the head end HE shown in FIG. 1, the frequency converter FC may be replaced with a simple amplifier in which case the signals $CH_1, \ldots, CH_n$ in the upgoing direction and the signals $CH_1°, \ldots, CH_n°$ in the down-going direction will share the same frequency band.

While the present invention has been shown and described in relation with the CSMA/CD system, it is similarly applicable to the simple CSMA system which lacks the CD capability. Then, the comparator 18 shown in FIG. 3 is needless and what is required of the receiver $RX_{CH}$ is the simple CS function.

In a modification to the illustrative embodiment, since the receiver $RX_{CH}$ needs only to perform the CS function, a channel in a frequency band even narrower than that of the original up-going channels $CH_i$ may be assigned to the down-going channels $CH_i°$. In such a case, the frequency converter FC in the head end HE is omissible and, instead, CS may be performed on each up-going channel $CH_i$ to deliver only the presence/absence of a carrier to each down-going channel $CH_i°$. For example, when a carrier is present (absent) in the up-going channel $CH_i$, the carrier will be passed (not passed) to the channel $CH_i°$.

Naturally, any other modulation system is applicable to the present invention. For example, using a frequency-shift keying (FSK) modulation system, a high frequency may be passed to the down-going channels $CH_i°$ the show "carrier present", and a low frequency to show "carrier absent". Then, the receiver $PX_{CH}$ at each node generates a CS signal with a high (low) frequency to indicate "carrier present (absent)". This type of system successfully narrows the exclusive frequency band assigned to the channels $CH_i°, \ldots, CH_n°$. Such will prove especially advantageous in conjunction with the single cable system in which the frequency converter FC in the head end HE is essential.

Figure 4:
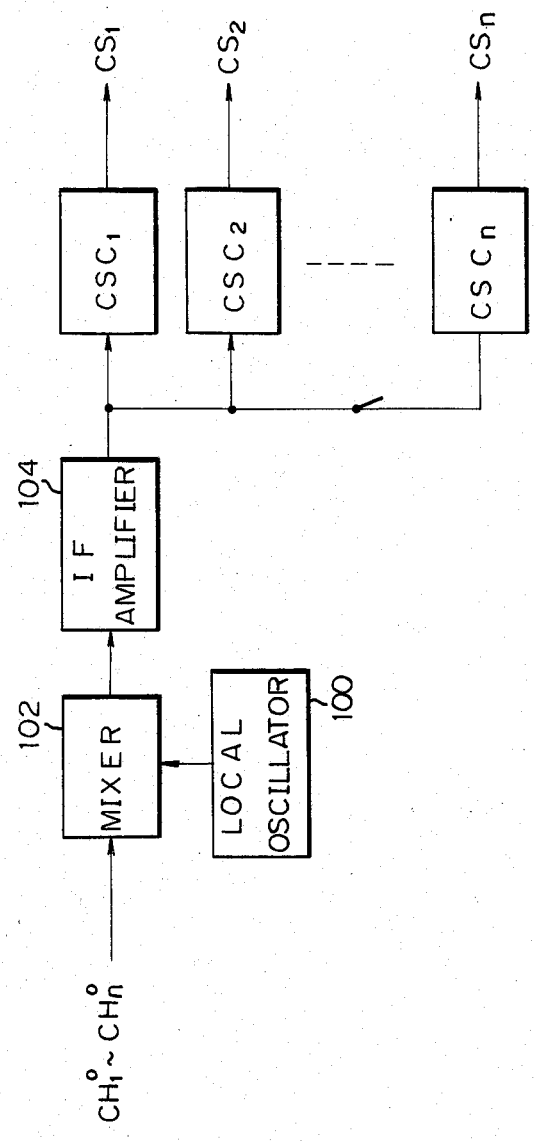
FIG. 4 is a block diagram of another node construction in accordance with the present invention.

Further modifying the illustrative embodiment provides the system construction shown in FIG. 4. Where the frequency band covering the signals $CH_i°$ is sufficiently narrow, the frequency is usually lowered to an intermediate frequency in the event of receipt of the signals $CH_i°, \ldots, CH_n°$. Therefore, so long as the frequency band occupied by all the channels at the intermediate frequency is not very wide, it is possible to effect CS simultaneously on all the channels $CH_1°, \ldots, CH_n°$ by means of the intermediate frequency using a relatively simple construction.

The simultaneous CS operation on all the channels is attainable with the system of FIG. 4. In FIG. 4, the down-going signals $CH_1°-CH_n°$ are each mixed with a local oscillation frequency of a local oscillator 100 by a mixer 102 and, then, amplified by an intermediate frequency amplifier 104. Carrier sensing circuits $CSC_1-CSC_n$ are each adapted to sense a carrier. Upon sensing a carrier, the circuits $CSC_1-CSC_n$ generate carrier sensing signals $CS_1-CS_n$, respectively.

Since the system of FIG. 4 eliminates the need for scanning the respective channels, a number assigned to an empty channel can immediately be known if any channel is empty. Hence, the time loss attributable to switching the channel i of the receiver $RX_{CH}$ is reduced.

In another embodiment of the present invention, the head end HE is constructed to detect presence/absence of a carrier in each of the up-going channels $CH_1, \ldots, CH_n$ and inform all the nodes of it by use of a special packet in the channel $CH_X$. Such a system is shown in FIGS. 5 and 6 in which the same or similar structural elements as those shown in FIG. 1 or 3 are designated by like reference numerals with suffix "a".

Figure 5:
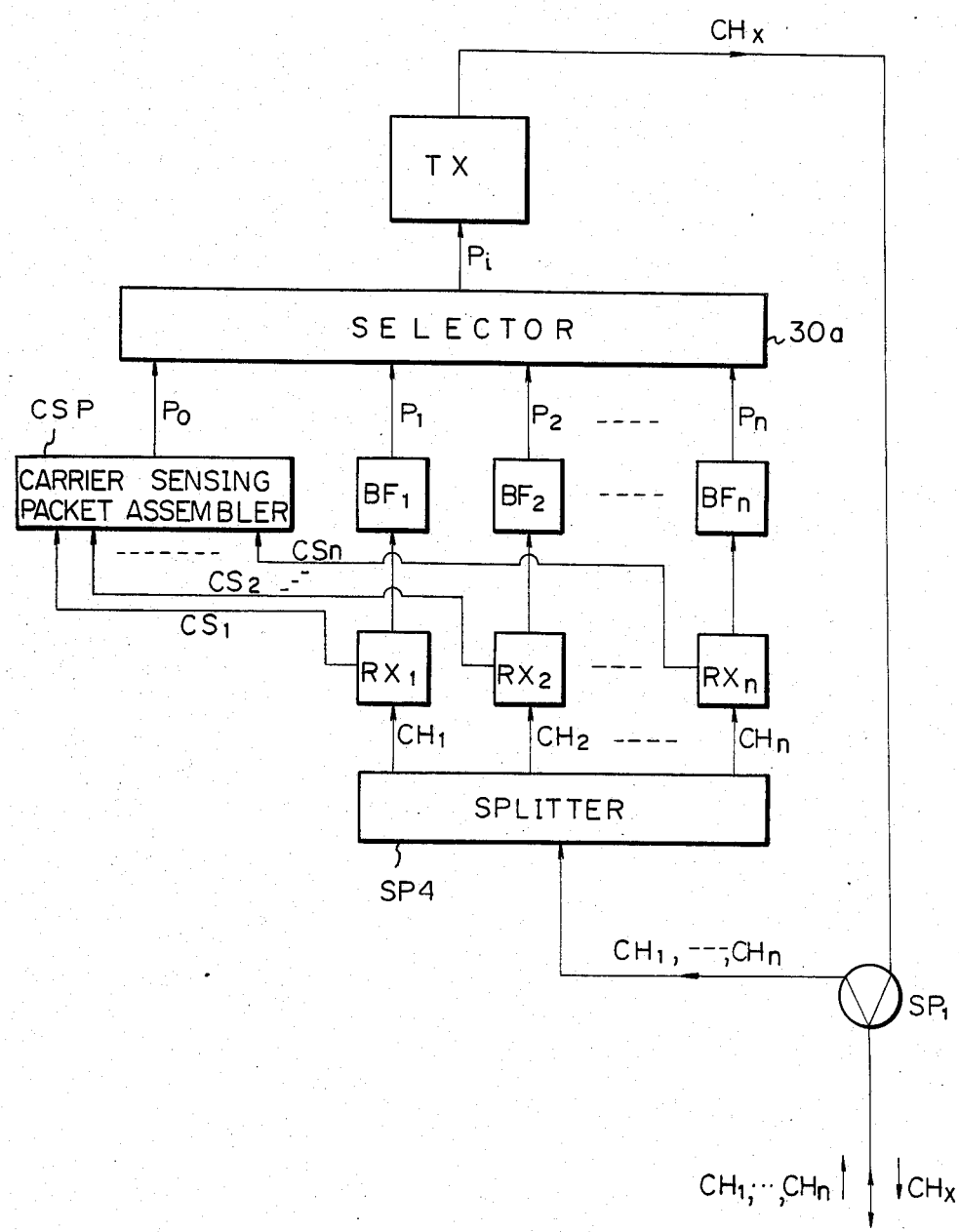
FIGS. 5 and 6 are block diagrams showing, respectively, a head end and a knode in accordance with another embodiment of the present invention.

In the head end HE of FIG. 5, a receiver $RX_j$ in an upgoing channel performs CS on a signal $CH_j$. A carrier sensing packet assembler CSP is adapted to assemble in a packet $P_0$ the respective carrier sensing signals $CS_j$ which are the results of CS on the signals $CH_i$ effected by the respective receivers $RX_i$. The packet $P_0$ is a special packet which is received by all the nodes distributed in the system. A selector 30a, like the selector 30 (see FIG. 1), is constructed to constantly deliver the packet $P_0$ after selecting any one of the packets $P_1, \ldots, P_n$. If none of the packets $P_1, \ldots, P_n$ is present in the buffers $BF_1, \ldots BF_n$, the selector 30a will continuously send out the special packet $P_0$.

Figure 6:
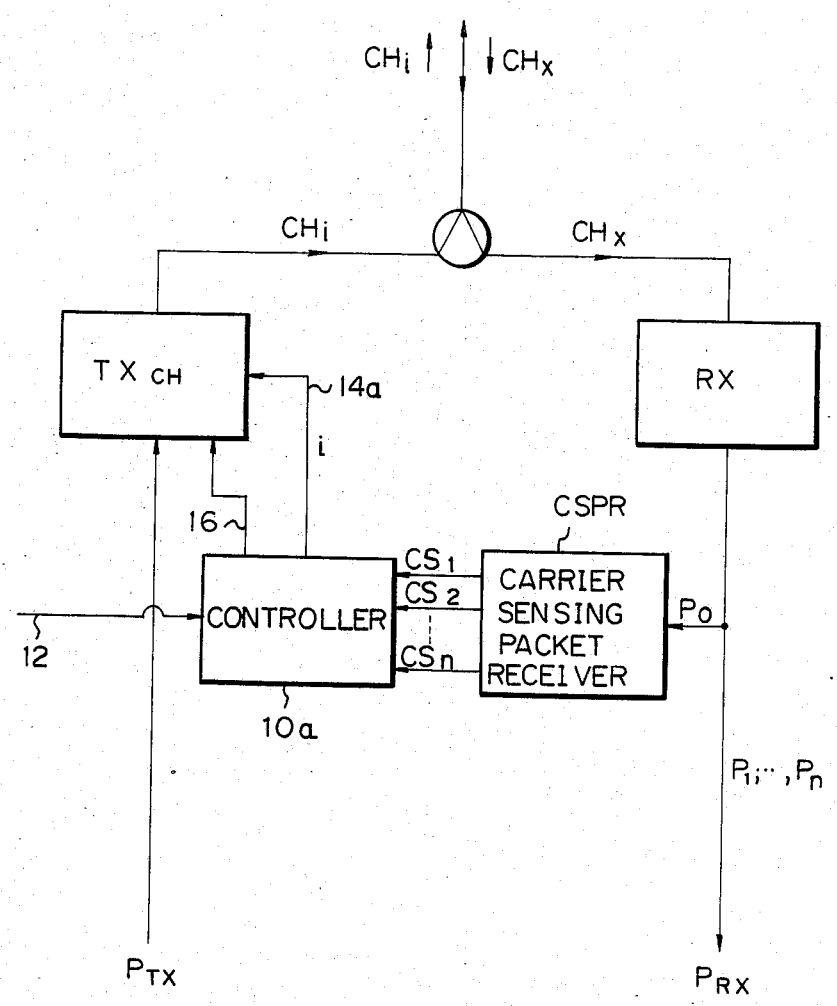

In a node shown in FIG. 6, the packet $P_0$ received by the receiver PX is captured by a carrier sensing packet receiver CSPR and thereby disassembled into the carrier sensing signals $CS_1, \ldots, CS_n$, which are then applied to a controller 10a. The controller 10a, therefore, is capable of seeing whether or not the channels $CH_1, \ldots, CH_n$ have been occupied and such can be done at all the nodes.

Since the controller 10a can see the states of all the channels at the same time, it is allowed to use an empty channel (i) by selecting it out of some empty channels, if present.

Where it is desired to transmit massive data such as facsimile data at a time, the generally used (single channel) CSMA/CD system would result in frequent collision and, therefore, critical deterioration to the system performance. For example, when 16M bits of data are transmitted by a CSMA/CD system having a line speed of 10 Mbps (e.g. ETHERNET), the facsimile signal will occupy the transmission path as long as substantially 1.6 seconds. This problem has customarily been solved by limiting the largest packet length, subdividing an exclusive period of time assinged to each transmission of a packet, admitting collision, and avoiding it by the back-off algorithm, thereby enabling another signal to be transmitted as well. Nevertheless, at least while massive facsimile data are being transmitted, the probability of collision grows very high to enhance the transmission delay to a considerable degree.

In accordance with the present invention, a remarkable decrease in the probability of collision is attainable by limiting the channels which are available for a signal having such a special traffic. For example, only the channels from the channel $CH_1$ to the channel $CH_a$ (a<n) may be assigned to a facsimile signal. In such a case, although the transmission delay may be enhanced in those particular channels depending upon the traffic, it will not entail any substantial increase in transmission delay in the other channels $CH_{a+1}$ to $CH_n$.

In summary, it will be seen that the present invention provides a multiaccess communications system which allows all the channels to be effectively used by means of a relatively simple system construction. Specifically, a single cable or a pair of cables can be effectively shared by various channels, while a transceiver needs only be installed in each node in correspondence with the single cable or the pair of cables, thereby realizing a communications system which makes the most of the characteristics of the channel division type multiaccess communications system.

Various modifications will become possible for those skilled in the art after receiving the teachings of the present disclosure without departing from the scope thereof.

What is claimed is:

1. A multiaccess communications system for a communications network in which a plurality of nodes are connected to a head end by a common multichannel transmission path to perform wideband transmission of packets between the nodes, comprising:
   (a) means for selectively causing each of the plurality of nodes to select an unoccupied one of a plurality of first channels of said transmission path to send a packet toward the head end over the selected unoccupied channel;
   (b) means in the head end for temporarily storing the packets received over the first channels and for sequentially transmitting the packets in the order of completion of the storage toward the plurality of nodes over a second channel, the second channel having line speed which is substantially equal to the product of the line speed of the first channels and the number of the first channels; and
   (c) wherein each of the plurality of nodes comprises means for fetching from the second channel a packet which is meant therefor.

2. A communications system as claimed in claim 1, wherein the head end performs carrier sensing on the first channels and sends results of the carrier sensing to the plurality of nodes over a plurality of third channels, the number of the third channels being equal to the number of the first channels; and the plurality of nodes receive the third channels to identify occupied/unoccupied conditions of the first channels.

3. A communications system as claimed in claim 1, wherein the head end performs carrier sensing on the first channels and sends results of the carrier sensing to the plurality of nodes over the second channel; and the plurality of nodes receive the second channel to identify occupied/unoccupied conditions of the first channels.

4. A communications system as claimed in claim 1, wherein the head end receives the first channels and transmits toward the plurality of nodes over a plurality of fourth channels, the number of the fourth channels being equal to the number of the first channels; and the plurality of nodes receive the fourth channels and sense presence/absence of carriers in the fourth channels to identify occupied/unoccupied conditions of the first channels.

5. A communications system as claimed in claim 1, wherein the path includes fourth channels and each of the nodes receives any of the fourth channels corresponding to one of the first channels which is being used for transmission of a packet and, comparing a packet received over the fourth channel with the transmitted packet, senses collision between the first and fourth channels.

6. A communications system as claimed in claim 1, wherein each of the nodes selects one of the plurality of first channels to to determine the occupied/unoccupied condition of the selected channel and, if the selected channel is unoccupied, starts transmission of a packet over the selected channel.

7. A communications system as claimed in claim 2, wherein each of the nodes selects one of the plurality of first channels to to determine the occupied/unoccupied condition of the selected channel and, if the selected channel is unoccupied, starts transmission of a packet over the selected channel.

8. A communications system as claimed in claim 3, wherein each of the nodes selects one of the plurality of first channels to to determine the occupied/unoccupied condition of the selected channel and, if the selected channel is unoccupied, starts transmission of a packet over the selected channel.

9. A communications system as claimed in claim 4, wherein each of the nodes selects one of the plurality of first channels to to determine the occupied/unoccupied condition of the selected channel and, if the selected channel is unoccupied, starts transmission of a packet over the selected channel.

10. A communications system as claimed in claim 5, wherein each of the nodes selects one of the plurality of first channels to to determine the occupied/unoccupied condition of the selected channel and, if the selected channel is unoccupied, starts transmission of a packet over the selected channel.

11. A communications system as claimed in claim 1, wherein each of the nodes identifies empty channels by substantially simultaneously sesing the presence/absence of carriers in at least two of the plurality of first channels, selects one of the unoccupied channels, and starts transmission of a packet over the selected channel.

12. A communications system as claimed in claim 2, wherein each of the nodes identifies empty channels by substantially simultaneously sensing the presence/absence of carriers in at least two of the plurality of first channels, selects one of the unoccupied channels, and starts transmission of a packet over the selected channel.

13. A communications system as claimed in claim 3, wherein each of the node identifies empty channels by substantially simultaneously sensing the presence/absence of carriers in at least two of the plurality of first channels, selects one of the unoccupied channels, and starts transmission of a packet over the selected channel.

14. A communications system as claimed in claim 4, wherein each of the nodes identifies empty channels by substantially simultaneously sensing the presence/absence of carriers in at least two of the plurality of first channels, selects one of the unoccupied channels, and starts transmission of a packet over the selected channel.

15. A communications system as claimed in claim 5, wherein each of the nodes identifies empty channels by substantially simultaneously sensing the presence/absence of carriers in at least two of the plurality of first channels, selects one of the unoccupied channels, and starts transmission of a packet over the selected channel.

16. A multiaccess communications system comprising:
a plurality of nodes, a head end and a multichannel transmission path connecting the nodes and the head end for wideband transmission of packets therebetween;
means for selectively causing a node to select an unoccupied one of a plurality of first channels of said transmission path to send to the head end, over the selected unoccupied channel, a packet addressed to another selected node;
means for causing the head to temporarily store packets received over the first channels and to sequentially transmit stored packets to the nodes over a second channel of said transmission path, in the order of completion of the storage;
wherein the line speed of the second channel is substantially equal to the sum of the line speeds of the first channels; and
wherein each node comprises means for fetching from the second channel packets addressed thereto.

17. A system as in claim 16 in which the head end includes means for carrier-sensing the first channels and for sending carrier-sensing results to the nodes over third channels of said transmission path, wherein the number of third channels is substantially equal to the number of first channels, and wherein the nodes including means for identifying unoccupied first channels on the basis of said carrier-sensing results received thereby over said third channels.

18. A system as in claim 16 in which the head end includes means for carrier-sensing the first channels and for sending carrier-sensing results to the nodes over the second channel, and wherein the nodes include means for identifying unoccupied first channels on the basis of said carrier-sensing results received thereby over said second channel.

19. A system as in claim 16 in which each node includes means for selecting a first channel and checking the occupied/unoccupied condition thereof, and for transmitting a packet over the selected channel if unoccupied and for selecting another channel if the originally selected channel is occupied.

20. A system as in claim 16 in which each node includes means for substantially simultaneously carrier-sensing at least two of the first channels to select an unoccupied first channel for transmission of a packet to the head end.

* * * * *